April 27, 1926.

W. R. BORDER

AUXILIARY DRILL CHUCK FOR BRACES

Filed Oct. 30, 1924

1,582,445

Inventor
William R. Border,
By Adam E. Fisher.
Attorney

Patented Apr. 27, 1926.

1,582,445

UNITED STATES PATENT OFFICE.

WILLIAM R. BORDER, OF BEDFORD, PENNSYLVANIA.

AUXILIARY DRILL CHUCK FOR BRACES.

Application filed October 30, 1924. Serial No. 746,755.

*To all whom it may concern:*

Be it known that WILLIAM R. BORDER, a citizen of the United States, residing at Bedford, in the county of Bedford and State of Pennsylvania, has invented certain new and useful Improvements in Auxiliary Drill Chucks for Braces, of which the following is a specification.

This invention is in the way of an auxiliary brace chuck for small drills, and the object of the invention is to provide means whereby small drills may be operatively mounted and used in an ordinary carpenter's or mechanic's brace.

In the drawing—

Figure 1:
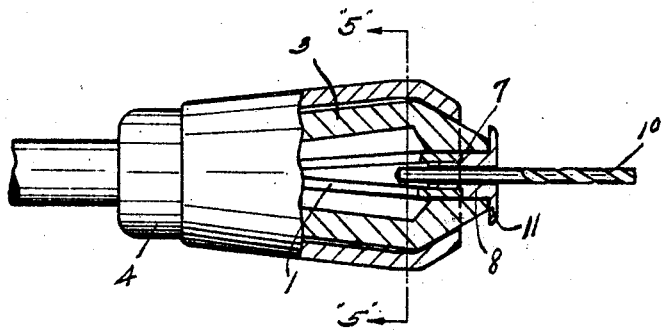
Figure 1 is a longitudinal section through the shank and jaws of a brace, showing this device mounted in place therein, and with a small drill held thereby.
Figure 3:
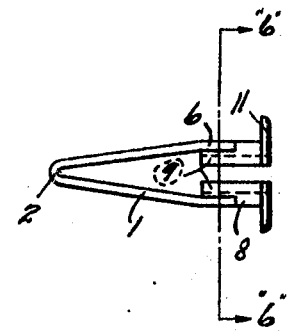
Figure 3 is a side elevation of the auxiliary chuck showing the jaws thereof spread asunder.
Figure 2:
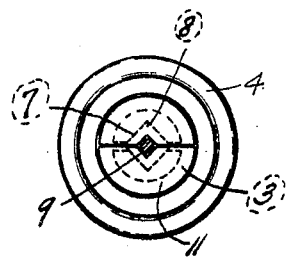
Figure 2 is an end view of the assembly as shown in Figure 1.
Figure 4:
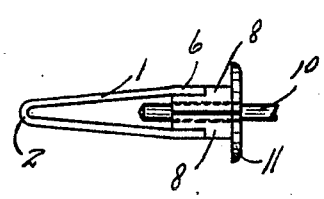
Figure 4 is a side elevation of the auxiliary chuck showing the jaws thereof compressed together and holding a small drill.
Figure 5:
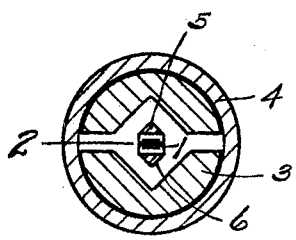
Figure 5 is a cross section through the shank and jaws of a brace, taken on the line 5—5 in Figure 1.
Figure 6:
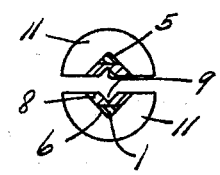
Figure 6 is a cross section through the auxiliary jaws, taken on the line 6—6 in Figure 3.

This invention consists of a spring 1 which is bent upon itself as shown at 2, and is so adapted for insertion between the chuck jaws 3 of a standard brace 4. This spring is made of a metal strip which is triangular in cross section, as shown at 5, so that the outer angular edges 6 thereof will slide into and be held by the angular recesses 7 of the regular chuck jaws 3, and so prevented from rotating.

At the outer ends of the spring 1 are rigidly mounted drill chuck jaws 8, having V-shaped slots 9 cut longitudinally along their inner faces and milled if desired so as to better grip the shank of the small drill 10 inserted between them. Flanges or lips 11 are rigidly mounted at the outer ends of the chuck jaws 8, to prevent the device from slipping too far into the brace jaws 3, and the slots 9 are of course extended on out through these lips. The chuck jaws 8 and lips 11 may be formed integrally with the spring 1, if preferred.

In use, the device is slipped in between the regular chuck jaws 3, and serve to grip the small drill 10 so that same may be used in the brace 4.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In combination with the regular chuck and chuck jaws of a mechanic's standard brace; a device of the kind described, comprising a spring angular in cross section and bent upon itself and so adapted for insertion between the said chuck jaws; drill chuck jaws at the outer ends of the said spring adapted to engage the shank of a relatively small drill; and lips at the ends of the drill chuck jaws engaging the ends of the regular chuck jaws to prevent the device from slipping too far into the brace.

In testimony whereof I affix my signature.

WILLIAM R. BORDER